(12) United States Patent
Valiulis et al.

(10) Patent No.: US 11,001,288 B2
(45) Date of Patent: *May 11, 2021

(54) CAR SEAT HOLDER (71) Applicants: Stanley Carl Valiulis, Rockford, IL (US); Lindsey Fleischhauer, Naperville, IL (US)

(72) Inventors: Stanley Carl Valiulis, Rockford, IL (US); Lindsey Fleischhauer, Naperville, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/680,321

(22) Filed: Nov. 11, 2019

(65) Prior Publication Data

US 2020/0079409 A1 Mar. 12, 2020

Related U.S. Application Data

(63) Continuation-in-part of application No. 29/681,922, filed on Feb. 28, 2019, and a continuation-in-part of application No. 16/149,104, filed on Oct. 1, 2018, now Pat. No. 10,723,376.

(60) Provisional application No. 62/565,678, filed on Sep. 29, 2017.

(51) Int. Cl.
| | |
|---|---|
| *A47D 1/10* | (2006.01) |
| *A47D 7/01* | (2006.01) |
| *A47D 7/04* | (2006.01) |
| *A47D 13/02* | (2006.01) |
| *A47C 1/11* | (2006.01) |
| *B62B 3/14* | (2006.01) |
| *B60N 2/26* | (2006.01) |

(52) U.S. Cl.
CPC ............ *B62B 3/144* (2013.01); *A47D 13/025* (2013.01); *B60N 2/26* (2013.01)

(58) Field of Classification Search
CPC ........... A47F 13/00; B62B 5/082; B62B 3/14; B62B 3/144; B60N 2/2842; B60N 2/26; A47D 13/025
USPC ...... 297/256.17; 280/33.991, 33.993; 5/98.1, 5/118
See application file for complete search history.

(56) References Cited

U.S. PATENT DOCUMENTS 1,389,073 A * 8/1921 Schlosser ............... B60N 3/008
5/118
1,732,520 A * 10/1929 Leatherman ........... A47B 31/06
5/118 X (Continued)

FOREIGN PATENT DOCUMENTS

EP 2298620 A2 3/2013

*Primary Examiner* — Rodney B White (57) ABSTRACT

A car seat holder is used to support a portable infant car seat by providing a flexible support. The apparatus comprises a first support, a second support, and a canvas. The first support and the second support are elongated members that extend across a shopping cart. The first support and the second support are rigid members that distribute the weight of an infant carriage device. The canvas is a flexible surface that extends from the first support to the second support across the shopping cart. The canvas provides a mechanism for transmitting the weight of the infant carriage device to the first support and the second support. In this way, the first support and second support hold the canvas in optimal position for holding an infant car seat. This arrangement frees up space within a shopping cart.

17 Claims, 10 Drawing Sheets

(56) References Cited

U.S. PATENT DOCUMENTS

| | | | | |
|---|---|---|---|---|
| 3,037,216 A * | 6/1962 | Stringer | B60N 2/2854 | 5/118 |
| 3,574,872 A * | 4/1971 | Mattila | A47D 13/02 | 5/118 X |
| 3,784,990 A * | 1/1974 | Elisofon | B60N 2/2854 | 5/118 X |
| 4,679,840 A * | 7/1987 | Fry | A45F 3/22 | 5/118 X |
| 4,807,314 A * | 2/1989 | Fry | A45F 3/22 | 5/118 |
| 4,971,343 A * | 11/1990 | Wood | B62B 3/1444 | 280/33.993 |
| 5,096,260 A * | 3/1992 | Hagerstrom | B62B 3/1444 | 297/256.17 |
| 5,188,421 A * | 2/1993 | Arseneault | B60N 2/28 | 297/182 |
| 5,470,039 A * | 11/1995 | Hilger | A47D 5/006 | 248/164 |
| 5,632,052 A * | 5/1997 | Michel | A47D 13/08 | 5/655 |
| 5,778,465 A * | 7/1998 | Myers | A47D 7/04 | 5/93.1 |
| 5,918,891 A | 7/1999 | Russell | | |
| 6,450,513 B1 * | 9/2002 | Bernstein | B62B 3/1468 | 280/33.991 |
| 6,526,608 B1 * | 3/2003 | Hsia | A47D 7/04 | 5/98.1 X |
| 6,539,563 B1 * | 4/2003 | Hsia | A47D 7/04 | 248/150 |
| 6,848,743 B1 * | 2/2005 | Collins | B62B 3/1456 | 297/256.17 X |
| 7,475,885 B2 * | 1/2009 | Kovath | B62B 3/1468 | 280/33.991 |
| 7,530,635 B2 * | 5/2009 | Schramek-Flye | A47D 1/103 | 297/17 |
| 7,722,058 B2 * | 5/2010 | Giampavolo | B62B 3/144 | 280/33.991 |
| 8,001,630 B2 * | 8/2011 | Burkholder | A47D 7/04 | 5/93.1 |
| 8,424,138 B1 * | 4/2013 | Pinnell | B62B 3/1444 | 5/98.1 X |
| 8,677,533 B2 * | 3/2014 | Barron | A47D 5/00 | 5/98.1 X |
| 9,622,592 B2 * | 4/2017 | Barron | A47D 5/00 | |
| 10,723,376 B2 * | 7/2020 | Valiulis | B60N 2/2842 | |
| 2009/0070930 A1 | 3/2009 | Roman | | |
| 2009/0205131 A1 * | 8/2009 | Bishop | A47C 17/80 | 5/118 |
| 2010/0007106 A1 * | 1/2010 | Gibson | A47D 1/10 | 297/256.17 X |
| 2014/0191547 A1 * | 7/2014 | Fink | B60N 2/2806 | 297/256.17 |
| 2017/0217340 A1 * | 8/2017 | Estraykh | B62B 3/1444 | |

* cited by examiner

CAR SEAT HOLDER

The current application claims a priority to a U.S. non-provisional application Ser. No. 16/149,104 filed on Oct. 1, 2018 now U.S. Pat. No. 10,723,376B2. The U.S. non-provisional application Ser. No. 16/149,104 was filed on Oct. 1, 2018 while Sep. 29, 2018 was on a weekend. The U.S. non-provisional application Ser. No. 16/149,104 claims a priority to a U.S. provisional application Ser. No. 62/565,678 filed on Sep. 29, 2017.

FIELD OF THE INVENTION

The present invention generally relates to car seats. More specifically, the car seat holder relates to an apparatus that spans across the width of a shopping cart, providing an elevated surface upon which a user may safely and conveniently place an infant within a standard removable car seat.

BACKGROUND OF THE INVENTION

A new parent must be ready to fully devote their time to caring for their infant. There can be no lapses of attention or windows of negligence, as murphy's law would suggest that the infant would certainly meet trouble. To this end, a wide variety of devices allow for monitoring of children and infants as they develop. From monitors to strollers to car seats, every precaution has been taken to ensure that an infant never has to be far from a caretaker's gaze. Further, many of these devices are well-equipped to provide a large amount of comfort to the infant.

Unfortunately, many of these devices are ill-equipped to address the issue of simultaneously caring for an infant and shopping for groceries. These activities combined provide a unique problem, specifically that carrying a baby in a car seat or stroller requires at least one hand and pushing a shopping cart requires two hands. To this end, the most common solution is for a parent or guardian to place a carriage or baby within a car seat into the shopping cart. On one hand, this does allow the parent to push the shopping cart while watching the infant or child. However, one common solution is for the parent or guardian to carry the infant in the car seat; in this case, the car seat the child is in takes up extra space within the shopping cart, making it difficult to add shopping items without smothering the infant or running out of space. What is needed is a hanging area capable of suspending the infant and the infant's mode of transportation over the shopping cart, thus freeing the space within the cart.

The present invention addresses this issue. The present invention is a car seat holder that allows the user to suspend a car seat, with a contained infant, above the base of a shopping cart. The present invention has two rods of adjustable length that span the width of the shopping cart. The rods support a hanging hammock that is capable of supporting the weight of an infant and an infant carrier. An adjustable band spanning between and connecting the two rods allows the user to lift and change the position of the present invention before or during use. In this way, the base of the cart is freed for the addition of items.

DETAILED DESCRIPTION OF THE INVENTION

All illustrations of the drawings are for the purpose of describing selected versions of the present invention and are not intended to limit the scope of the present invention.

Figure 1:
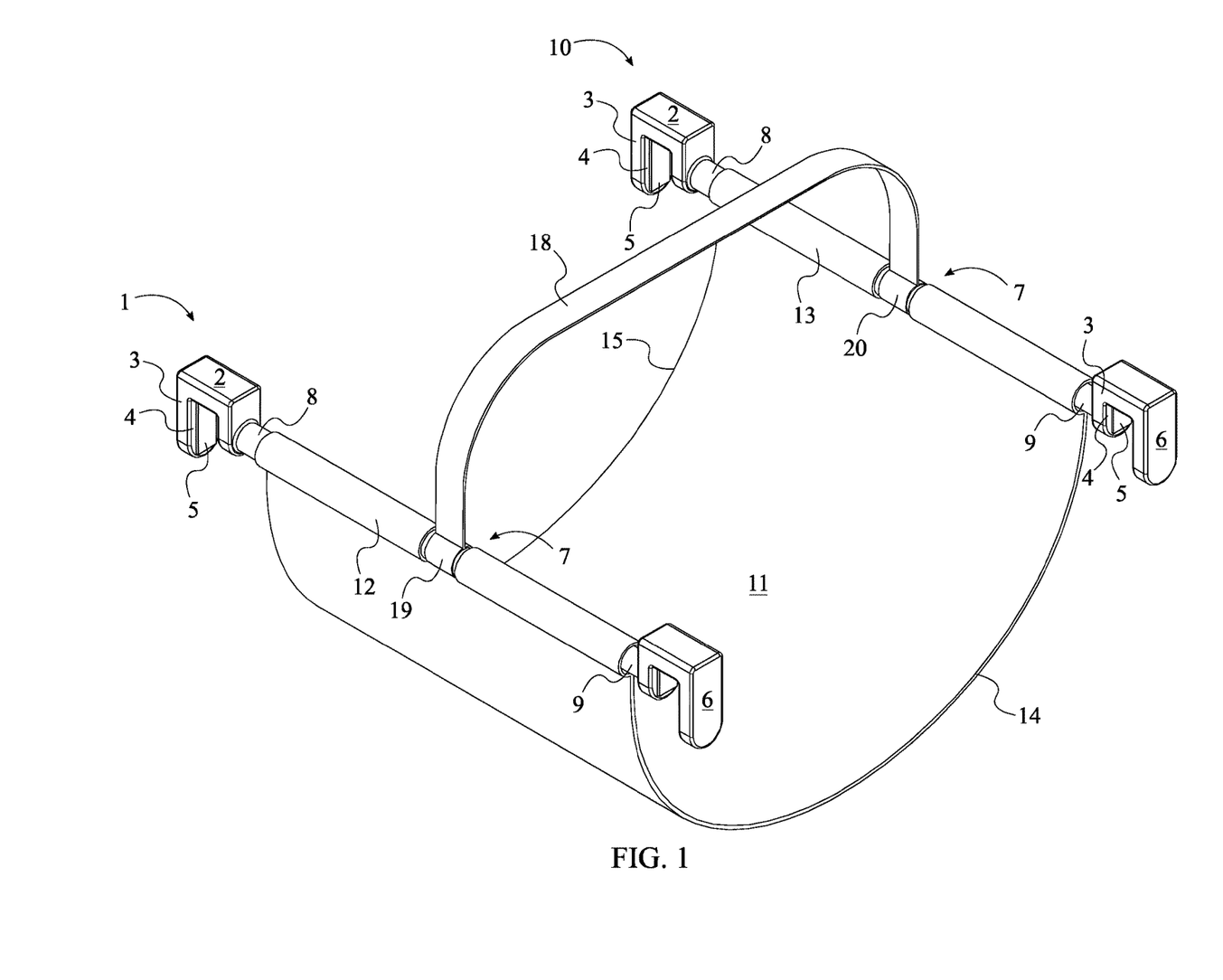
FIG. 1 is a front-top perspective view of the present invention.

The present invention is a car seat holder that is used to support a portable infant car seat by providing a flexible support. The present invention is also configured to adjust to different shopping cart sizes or widths and to collapse for ease of storage and transportation. The present invention comprises a first support 1, a second support 10, and a canvas 11, as seen in FIG. 1. The first support 1 and the second support 10 are elongated members that extend across a shopping cart in the preferred usage of the present invention. The first support 1 and the second support 10 are rigid members that distribute the weight of an infant carriage device. The canvas 11 is a flexible surface that extends from the first support 1 to the second support 10 across the shopping cart. The canvas 11 provides a mechanism for transmitting the weight of the infant carriage device to the first support 1 and the second support 10.

Figure 2:
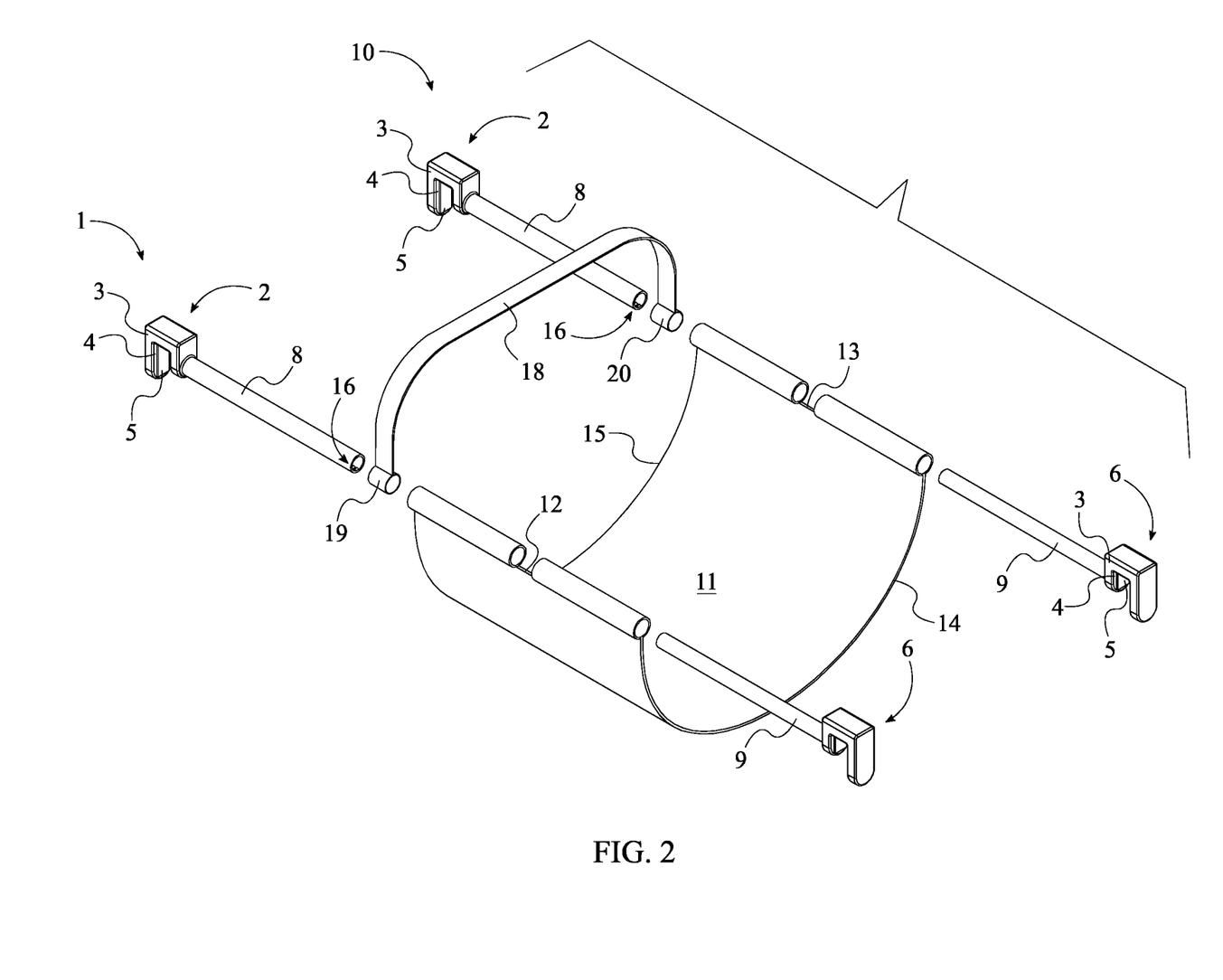
FIG. 2 is an exploded front-top perspective view of the present invention.

The general configuration of the aforementioned components allows the present invention to efficiently and effectively contain and lift a portable infant car seat. In a first embodiment of the present invention, the first support 1 and the second support 10 each comprise a left bracket 2, a right bracket 6, and a length-adjustable member 7, as seen in FIG. 2. The left bracket 2 is the rigid connector that joins the first support 1 and the second support 10 to a shopping cart. The right bracket 6 is a similar rigid connector that joins the first support 1 and the second support 10 to a shopping cart, opposite the left bracket 2. In this way, the left bracket 2 and the right bracket 6 allow for transmission of gravitational forces from the first support 1 and the second support 10 onto the framework of the shopping cart. The length-adjustable member 7 is a set of concentric tubes or hollow supports that telescope within each other to allow the present invention to change size. This arrangement enables smooth modification of the length of the first support 1 and the second support 10 in order to match the spanning distance of the shopping cart.

Furthermore, the canvas 11 comprises a first edge 12 and a second edge 13. The first edge 12 and the second edge 13 are positioned opposite each other, defining the border of the canvas 11, as seen in FIG. 2. The left bracket 2 is terminally connected to the length-adjustable member 7. Similarly, the right bracket 6 is terminally connected to the length-adjustable member 7, opposite the left bracket 2. This arrangement allows the length-adjustable member 7 to expand to the appropriate size to fit atop a shopping cart. The first edge 12 and the second edge 13 are positioned opposite to each other across the canvas 11. This arranges the first edge 12 and the second edge 13 in optimal position for connecting to the first support 1 and the second support 10. The first edge 12 is slidably connected along the length-adjustable member 7 of the first support 1. This arrangement allows the first edge 12 to move along the length-adjustable member 7, thus providing the canvas 11 with the ability to adjust due to the weight of held items. Similarly, the second edge 13 is slidably connected along the length-adjustable member 7 of the second support 10. This arrangement allows the second edge 13 to move along the length-adjustable member 7, thus providing the canvas 11 with the ability to adjust due to the weight of held items.

In order to connect the present invention securely to a shopping cart, the left bracket 2 and the right bracket 6 must each be adequately equipped to brace against a shopping cart. To this end, the left bracket 2 and the right bracket 6 each comprise a U-shaped body 3 and a padding 5. The U-shaped body 3 is arranged to situate comfortably atop the edge of a shopping cart. The padding 5 prevents the present invention from becoming damaged during use or from the vibration from using the cart to impact an infant contained within the present invention itself. Further, the U-shaped body 3 comprises an inner surface 4, as seen in FIG. 1. The inner surface 4 is the surface which is pressed against a shopping cart in the preferred usage of the present invention. The padding 5 is connected along the inner surface 4. This arrangement ensures that the padding 5 is appropriately positioned for usage upon a shopping cart.

Figure 4:
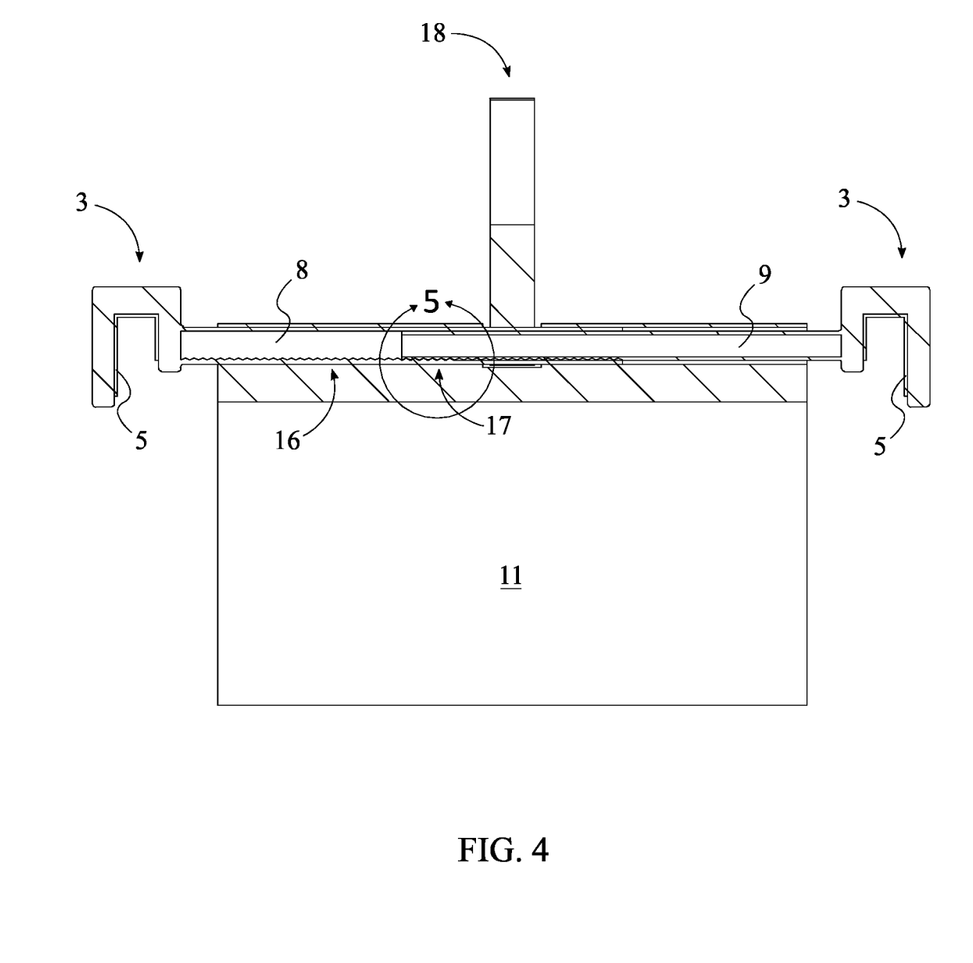
FIG. 4 is a left cross-sectional view of the present invention taken along line 4-4 in FIG. 3.

In order to operate properly, the present invention requires that the length-adjustable member 7 can expand, and contract as needed. To this end, the length-adjustable member 7 comprises a first tubular body 8 and a second tubular body 9, seen in FIG. 4. The first tubular body 8 is a hollow cylindrical member that allows for the present invention to fit upon a shopping cart. Similarly, the second tubular body 9 is a hollow cylindrical member that allows for the present invention to fit upon a shopping cart. In this way, the first tubular body 8 and the second tubular body 9 are positioned to be telescopically engaged to each other. This allows for modification and control over the length of the length-adjustable member 7.

Figure 5:
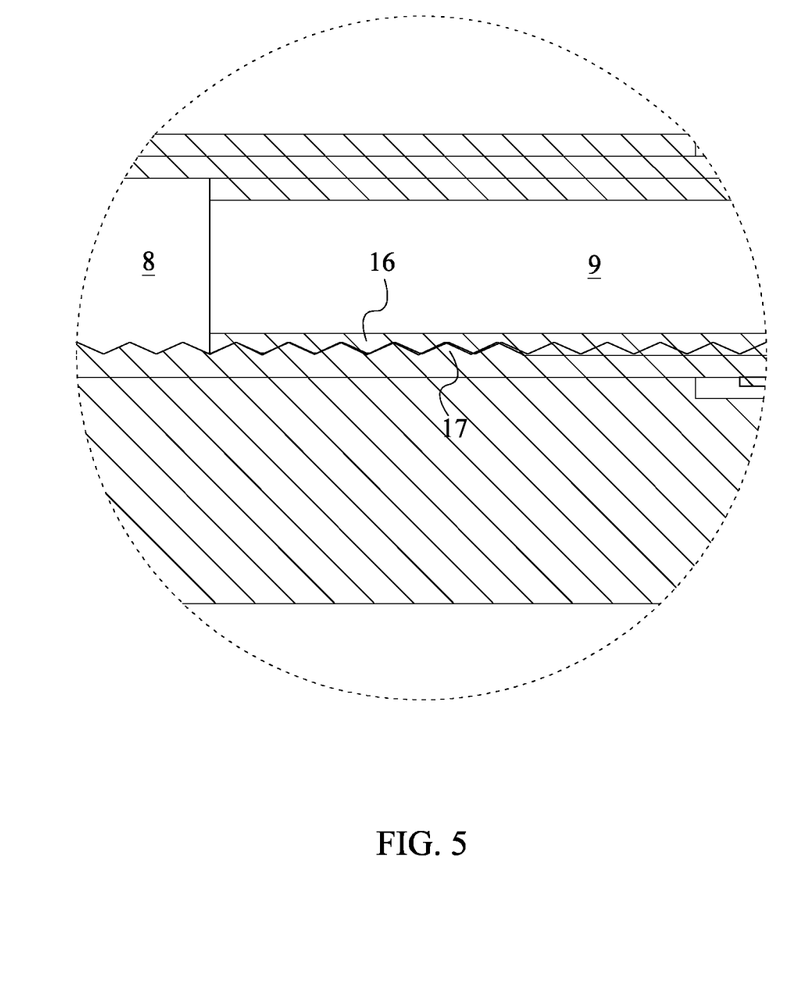
FIG. 5 is a detailed view of the present invention taken about circle 5 in FIG. 4.

Upon modifying the length of the length-adjustable member 7, the user may wish to lock the first tubular body 8 and the second tubular body 9 in place with respect to each other. To this end, the present invention comprises a first set of teeth 16 and a second set of teeth 17, as seen in FIG. 5. The first set of teeth 16 is a linear pattern of triangular extrusions that allows for engagement of the second set of teeth 17. The first set of teeth 16 is connected along the first tubular body 8. The first set of teeth 16 extend across a short distance of the first tubular body 8. The second set of teeth 17 is connected along the second tubular body 9. The second set of teeth 17 extend across the length of the second set of teeth 17. The first set of teeth 16 and the second set of teeth 17 are slidably interlocked with each other. In this way, the user may slide the first tubular body 8 within the second tubular body 9 and lock the first tubular body 8 in place relative to the second tubular body 9.

The present invention further comprises a length-adjustable strap 18. The length-adjustable strap 18 is a flexible fabric unit that allows for movement of the present invention from place to place. The length-adjustable strap 18 comprises a first strap end 19 and a second strap end 20, as seen in FIG. 2. The first strap end 19 and the second strap end 20 allow for connection of the length-adjustable strap 18 to the present invention. The first strap end 19 is rotatably connected to the length-adjustable member 7 of the first support 1. This allows the first strap end 19 to adjust in position relative to the first support 1. The second strap end 20 is rotatably connected to the length-adjustable member 7 of the second support 10. This allows the second strap end 20 to adjust in position relative to the second support 10.

Figure 6:
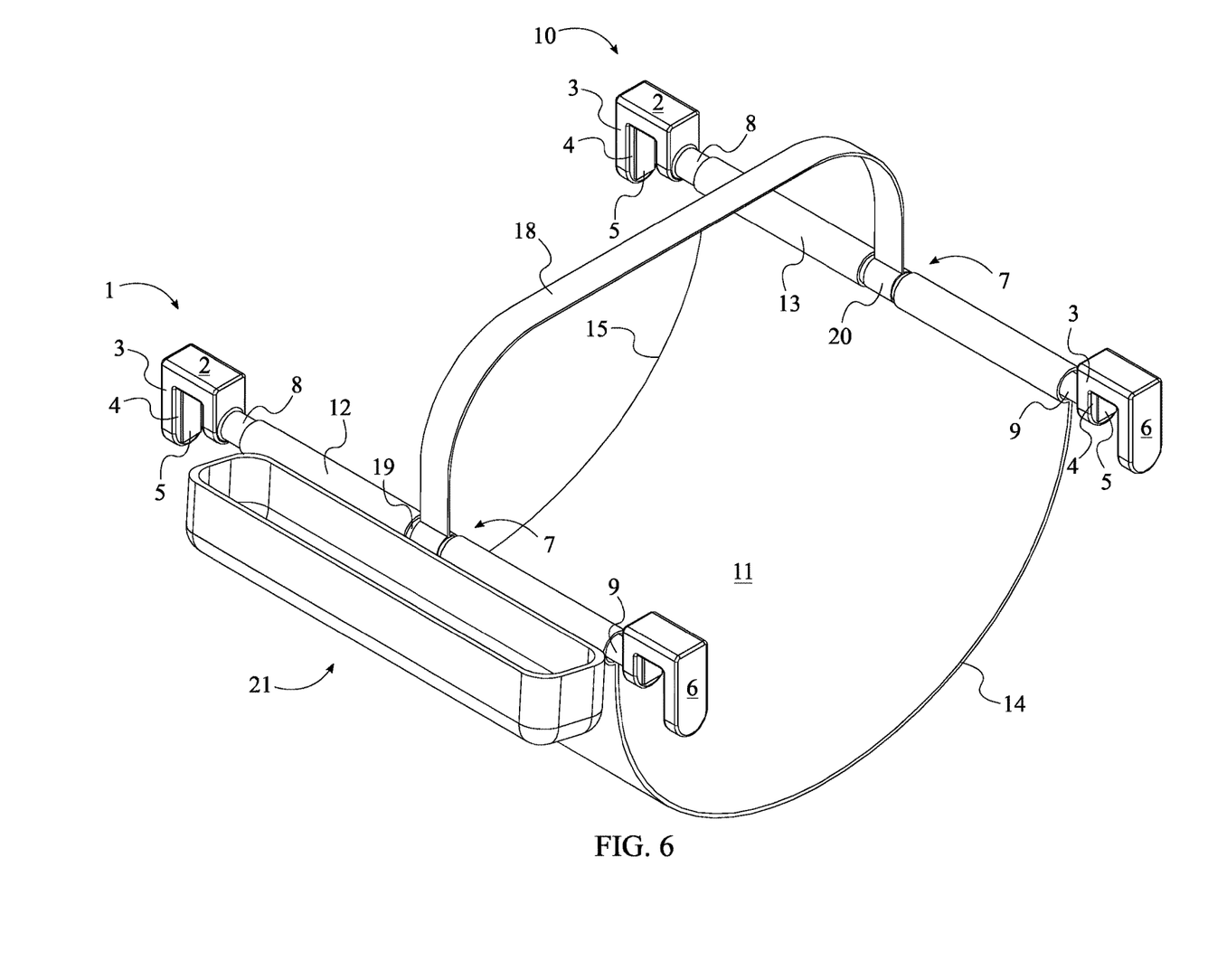
FIG. 6 is a front-top perspective view of the basket.

In an exemplary embodiment, the user may wish to carry or transport items other than an infant car seat in the present invention. To address this need, in an alternative embodiment, the present invention further comprises a basket 21, seen in FIG. 6. The basket 21 is a section of the present invention that allows for containment of items near the canvas 11. The basket 21 is mounted along the first support 1. Further, the basket 21 is positioned opposite to the canvas 11 about the first support 1. This positioning and orientation ensure that the basket 21 is positioned optimally for item storage.

Figure 3:
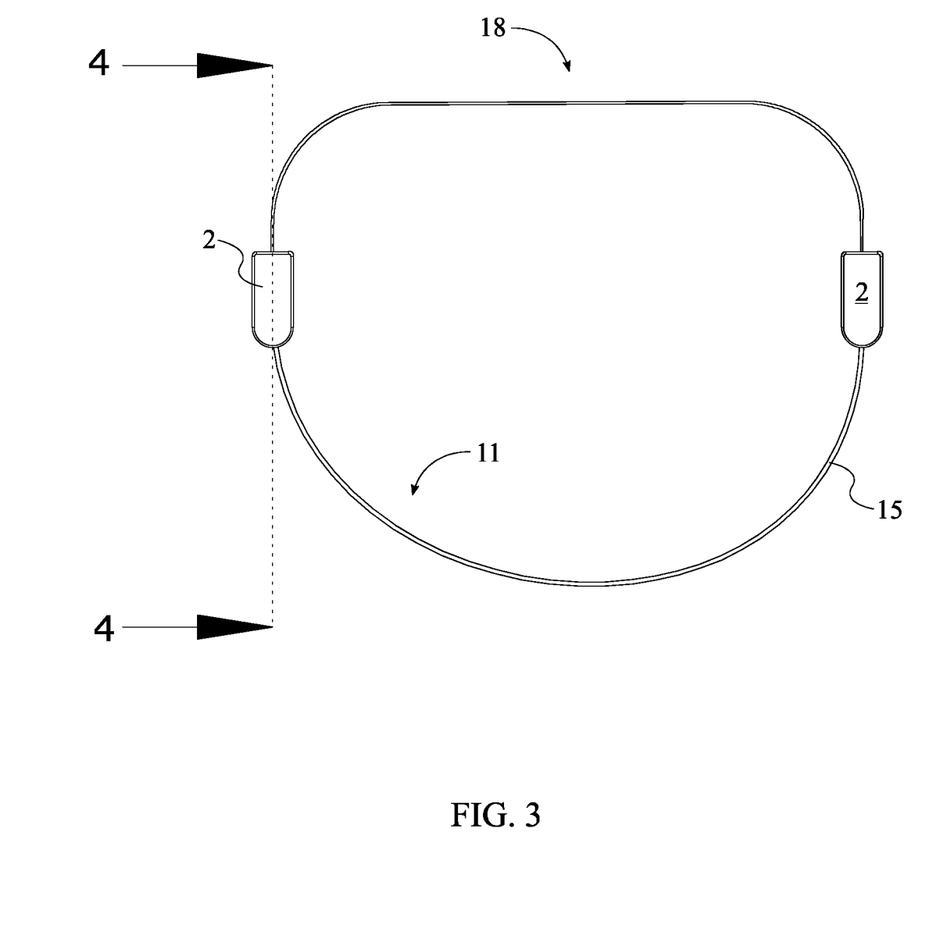
FIG. 3 is a left view of the present invention.

Optimal cart width usage is required to guarantee secure containment of a portable car seat. To this end, the canvas 11 further comprises a third edge 14 and a fourth edge 15. The third edge 14 and the fourth edge 15 are positioned opposite to each other across the canvas 11. This arrangement reinforces the space between the third edge 14 and the fourth edge 15. The third edge 14 and the fourth edge 15 are positioned in between the first edge 12 and the second edge 13. This ensures that the third edge 14 and the fourth edge 15 are along the sides of a shopping cart. The third edge 14 is positioned adjacent to the left bracket 2 of the first support 1 and the left bracket 2 of the second support 10. Similarly, the fourth edge 15 is positioned adjacent to the right bracket 6 of the first support 1 and the right bracket 6 of the second support 10, as seen in FIG. 3. This arrangement ensures that the canvas is optimally sized to completely span the width of a shopping cart.

The first tubular body 8 and the second tubular body 9 may be made of any of a variety of materials that enable telescopic motion of the length-adjustable member 7. In an exemplary embodiment, the first tubular body 8 and the second tubular body 9 traverse along the third edge 14 and the fourth edge 15. This arrangement allows the first tubular body 8 and the second tubular body 9 to hang from the sides of a shopping cart directly, as a supplemental support for the left bracket 2 and the right bracket 6. The length-adjustable strap 18 may utilize a rigid length-adjustment tool in order to assist in modifying the length of the length-adjustable strap 18. In another exemplary embodiment, the canvas 11 is made of rigid material, such that a contained infant in a car seat does not shift or swing while shopping.

Figure 7:
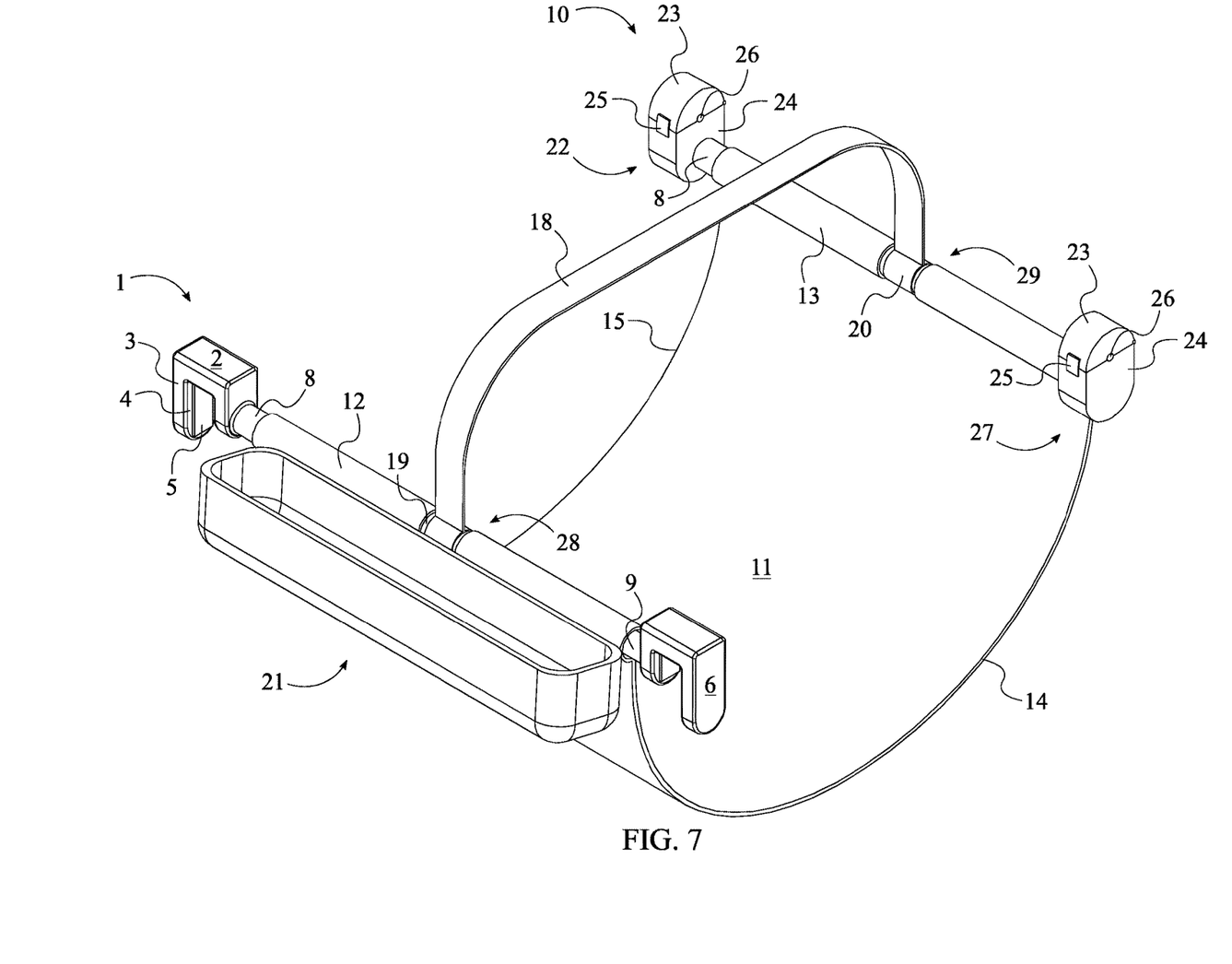
FIG. 7 is a front-top perspective view of an alternate embodiment of the present invention.

While the first embodiment addresses the issue of easily adding a supportive flexible surface to the inside of a shopping cart, another embodiment is necessary in order to create a more secure connection to the shopping cart that locks into place. In a second embodiment of the present invention, the first support 1 comprises a left bracket 2, a right bracket 6, and a first length-adjustable member 28. Similarly, the second support 10 comprises a left clamp 22, a right clamp 27, and a second length-adjustable member 29, as shown in FIG. 7. The left bracket 2 and the right bracket 10 are rigid connectors that join the first support 1 to a shopping cart. In this way, the left bracket 2 and the right bracket 10 allow for transmission of gravitational forces from the first support 1 onto the framework of the shopping cart. The first length-adjustable member 28 is a set of concentric tubes or hollow supports that telescope within each other to allow the present invention to change size. Likewise, the second length-adjustable member 29 is also a set of concentric tubes or hollow supports that telescope within each other to allow the present invention to change size. The left clamp 22 is a connector that joins the second support 10 to a shopping cart, preferably joining to a shallow folding shelf or storage area within many conventional shopping carts. Similarly, the right clamp 27 joins the second support 10 to a shopping cart, offset from the left clamp 22. The left clamp 22 and the right clamp 27 allow for transmission of gravitational forces from the second support 10 onto the framework of the shopping cart, opposite from the left bracket 2 and the right bracket 6. This arrangement enables smooth modification of the length of the first support 1 and the second support 10 in order to match the spanning distance of the shopping cart. The canvas 11 comprises a first edge 12 and a second edge 13, which are positioned opposite to each other across the canvas 11. In the second embodiment, the first edge 12 is slidably connected along the first length-adjustable member 28, and the second edge 13 is slidably connected along the second length-adjustable member 29. Thus, the first edge 12 and the second edge 13 are both able to maintain a consistent length while respectively sliding along the first length-adjustable member 28 and the second length-adjustable member 29.

The members must have adjustable lengths to ensure a secure fit across differently-sized shopping carts. The left bracket 2 is terminally connected to the first length-adjustable member 28. Similarly, the right bracket 6 is terminally connected to the first length-adjustable member 28, opposite the left bracket 8. This arrangement positions the left bracket 2 and the right bracket 6 appropriately for supporting and adjusting the first length-adjustable member 28. The left clamp 22 is terminally connected to the second length-adjustable member 29. Similarly, the right clamp 27 is terminally connected to the second length-adjustable member 29, opposite the left clamp 22. Thus, the first clamp 22 and the second clamp 27 are positioned to define the width of the second length-adjustable member 29.

The second embodiment of the present invention benefits from the addition of a secure fastening mechanism that can prevent undesirable detachment of the first support 1 and the second support 10 from a shopping cart. The left clamp 22 and the right clamp 27 provide this ability, with each comprising an upper jaw 23, a lower jaw 24, and a releasable locking mechanism 25. The upper jaw 23 is a generally claw-shaped rigid component that enables engagement with a shopping cart. The lower jaw 24 is a similarly claw-shaped rigid component operating adjacent to the upper jaw 23. The releasable locking mechanism 25 relates to any of latches, fastening buttons, adhesives, locks, or a variety of other devices capable of connecting the upper jaw 23 to the lower jaw 24. The upper jaw 23 and the lower jaw 24 are hingedly connected to each other. Such an arrangement provides the ability of the upper jaw 23 and the lower jaw 24 to engage a shopping cart relative to each other. In alternative embodiments, the upper jaw 23 and the lower jaw 24 are connected via any of a plurality of secure, releasable fastening devices, including screws, bolts, nuts, washers, nails, buttons, or other devices. The releasable locking mechanism 25 is operatively integrated in between the upper jaw 23 and the lower jaw 24, wherein the releasable locking mechanism 25 is used to selectively clamp the upper jaw 23 and lower jaw 24 together. This arrangement allows the left clamp 22 and the right clamp 27 with the ability to hinge together about a shopping cart and secure in place with the releasable locking mechanism 25.

The upper jaw 23, the lower jaw 24, and the releasable locking mechanism 25 of both the left clamp 22 and the right clamp 27 enable connection especially to a rod that spans the width of conventional shopping carts. To optimize the contact surface between the left clamp 22 and the right clamp 27 with the shopping cart, the left clamp 22 and the right clamp 27 each further comprise a rod-receiving mouth 26. The rod-receiving mouth 26 is a preferably circular cut traversing through the left clamp 22 and the right clamp 27. The rod-receiving mouth 26 of the left clamp 22 is positioned parallel to the first length-adjustable member 28. Similarly, the rod-receiving mouth 26 of the right clamp 27 is positioned parallel to the first length-adjustable member 28. In this way, the rod-receiving mouth 26 of the left clamp 22 and the right clamp 27 is able to connect with a rod extending across a width of a conventional shopping cart. The rod-receiving mouth 26 of the left clamp 22 and the rod-receiving mouth 26 of the right clamp 27 are positioned collinear to each other. Thus, the rod-receiving mouth 26 enables acceptance and secure connection of a single crossbeam, -bar, or -rod of a shopping cart.

The first length-adjustable member 28 and the second length-adjustable member 29 both require the ability to change length for appropriate addition to a shopping cart. To achieve this, the first length-adjustable member 28 and the second length-adjustable member 29 each comprise a first tubular body 8 and a second tubular body 9. Thus, the first length-adjustable member 28 and the second length-adjustable member 29 can be modified to provide appropriate support for the second embodiment of the present invention. The first tubular body 8 and the second tubular body 9 are telescopically engaged to each other. In this way, the first tubular body 8 is able to extend relative to the second tubular body 9.

The canvas 11 in the second embodiment of the present invention extends from the first support 1 to the second support 10. In the second embodiment, the third edge 14 is positioned adjacent to the left clamp 22 and the left bracket 2. Thus, the third edge 14 preferably denotes a boundary representing the left edge of the canvas 11. The fourth edge 15 is positioned adjacent to the right clamp 27 and the right bracket 6. Thus, the fourth edge 15 preferably denotes a boundary representing the right edge of the canvas 11. Such notation delineates the width of the canvas 11 extending across, in the preferred usage of the present invention, the width of the shopping cart.

Figure 8:
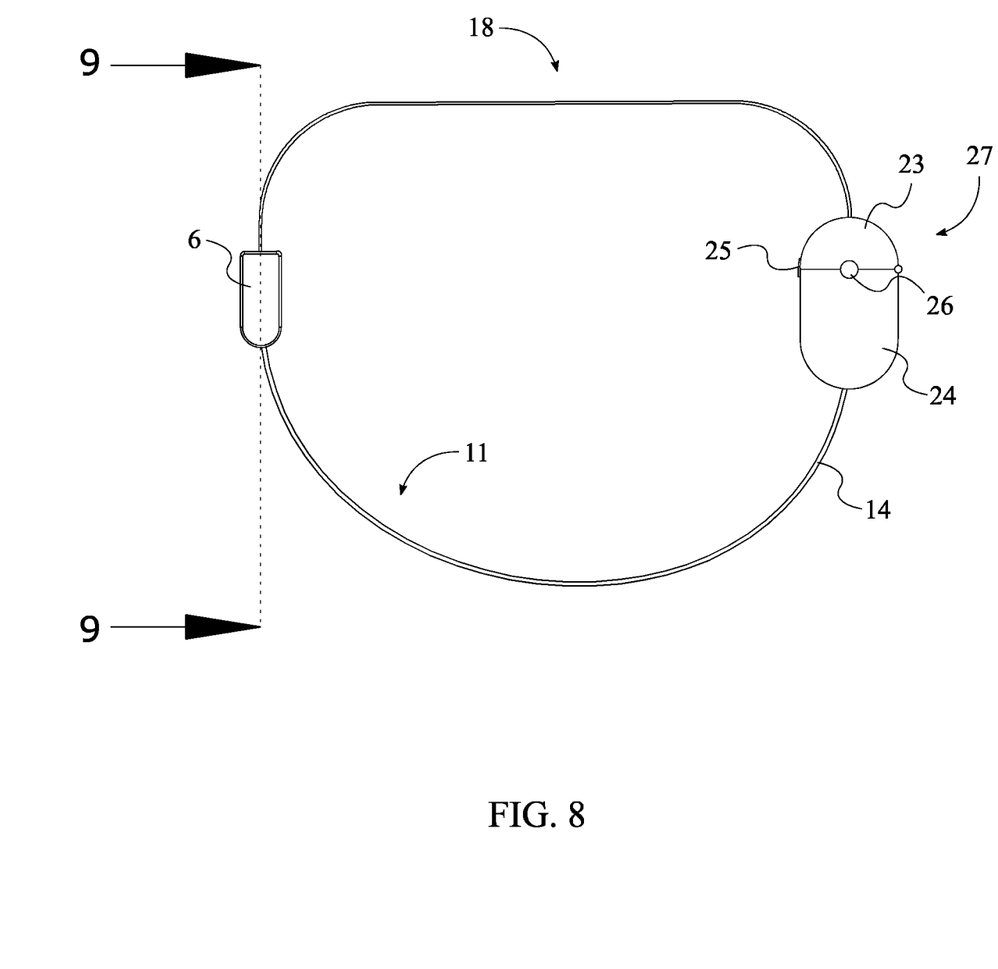
FIG. 8 is a right view of the alternate embodiment of the present invention.
Figure 9:
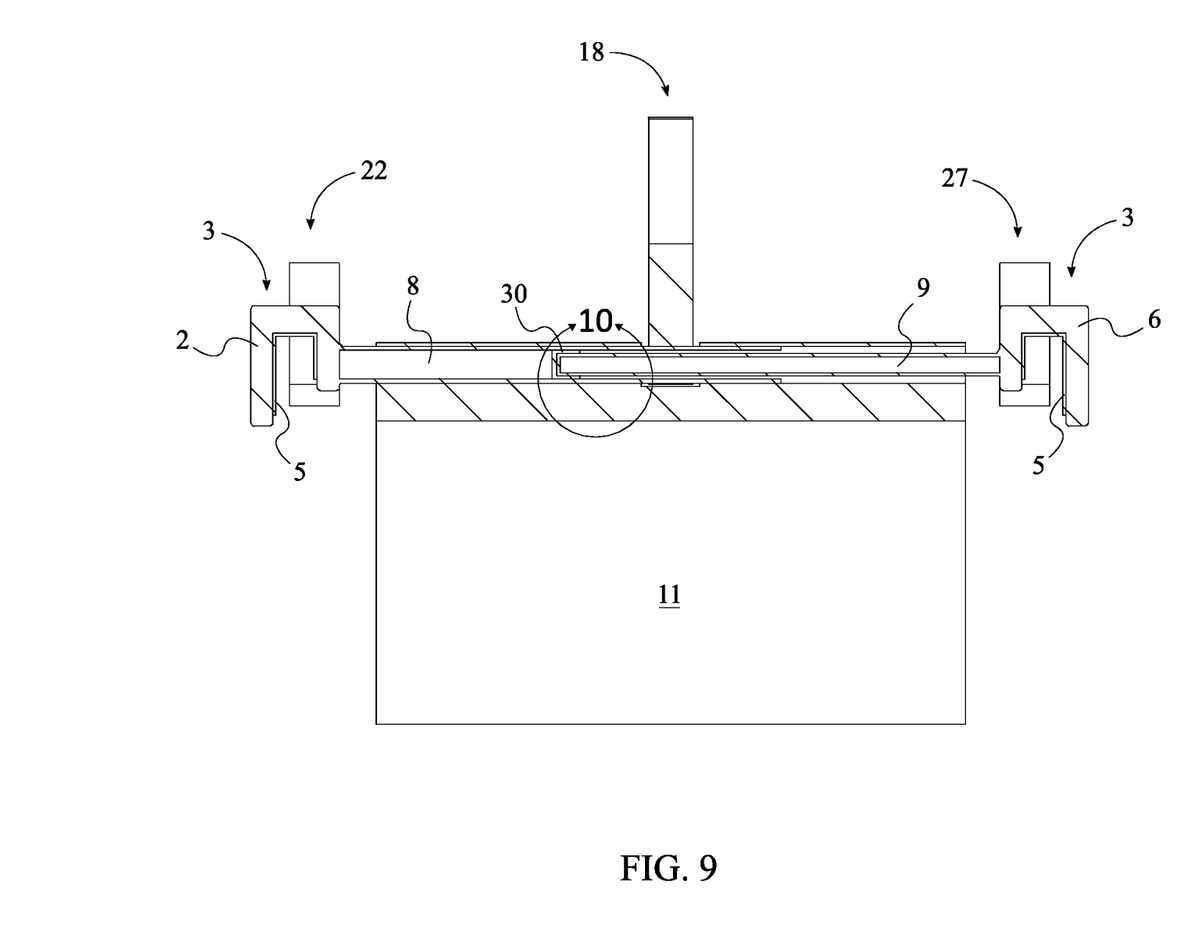
FIG. 9 is a front cross-sectional view of the alternate embodiment of the present invention taken along line 9-9 in FIG. 8.
Figure 10:
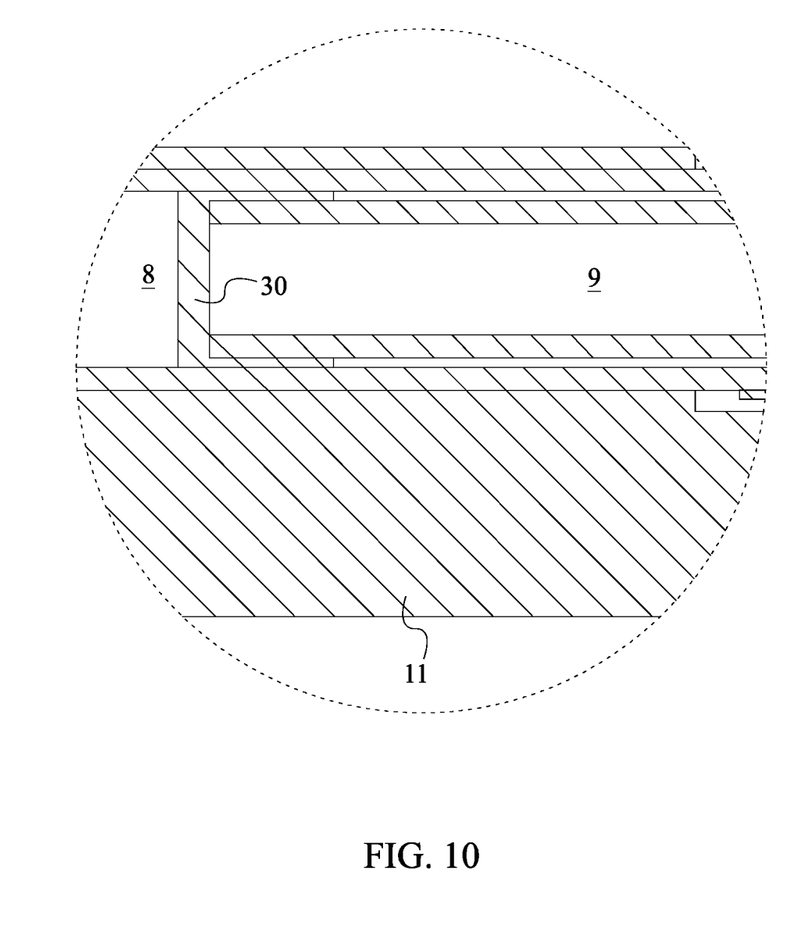
FIG. 10 is a detailed view of the alternate embodiment of the present invention taken about circle 10 in FIG. 9.

The second embodiment of the present invention enables a novel mechanism for adjusting the length of the first length-adjustable member 28 and the second length-adjustable member 29, as seen in FIG. 8. The first length-adjustable member 28 and the second length-adjustable member 29 each comprise an annular retention cap 30. As shown in FIGS. 9 and 10, the annular retention cap 30 is a generally ring-shaped unit preferably made of high-friction materials, including, but not limited to, a variety of rubbers and viscoelastic polymeric materials, which envelops the end of a rod or tube. The annular retention cap 30 is terminally mounted to the second tubular body 9. Thus, the annular retention cap 30 covers the ends of the second tubular body 9, opposite the right bracket 6 and the right clamp 27. The annular retention cap 30 is compressively connected within the first tubular body 8. In this way, the annular retention cap 30 removably secures the second tubular body 9 within the first tubular body 8. Such an arrangement allows the user to fine-tune the length of the first length-adjustable member 28 and the second length-adjustable member 29.

The second embodiment of the present invention further comprises a length-adjustable strap 18. The length-adjustable strap 18 is a flexible fabric unit that allows for movement of the present invention from place to place. The length-adjustable strap 18 comprises a first strap end 19 and a second strap end 20. The first strap end 19 and the second strap end 20 allow for connection of the length-adjustable strap 18 to the second embodiment of the present invention. The first strap end 19 is rotatably connected to the first length-adjustable member 28. This allows the first strap end 19 to adjust in position relative to the first support 1. The second strap end 20 is rotatably connected to the second length-adjustable member 29. This allows the second strap end 20 to adjust in position relative to the second support 10.

Although the invention has been explained in relation to its preferred embodiment, it is to be understood that many other possible modifications and variations can be made without departing from the spirit and scope of the invention as hereinafter claimed.

What is claimed is:

1. A car seat holder comprises:
a first support;
a second support;
a canvas;
the first support comprises a left bracket, a right bracket, and a first length-adjustable member;
the second support comprises a left clamp, a right clamp, and a second length-adjustable member;
the canvas comprises a first edge and a second edge;
the left bracket being terminally connected to the first length-adjustable member;
the right bracket being terminally connected to the first length-adjustable member, opposite the left bracket;
the left clamp being terminally connected to the second length-adjustable member;
the right clamp being terminally connected to the second length-adjustable member, opposite the left clamp;
the first edge and the second edge being positioned opposite to each other across the canvas;
the first edge being slidably connected along the first length-adjustable member; and
the second edge being slidably connected along the second length-adjustable member.

2. The car seat holder as claimed in claim 1 comprises:
the left bracket and the right bracket each comprise a U-shaped body and a padding;
the U-shaped body comprises an inner surface; and
the padding being connected along the inner surface.

3. The car seat holder as claimed in claim 1 comprises:
the left clamp and the right clamp each comprise an upper jaw, a lower jaw, and a releasable locking mechanism;
the upper jaw and the lower jaw being hingedly connected to each other; and
the releasable locking mechanism being operatively integrated in between the upper jaw and the lower jaw, wherein the releasable locking mechanism is used to selectively clamp the upper jaw and lower jaw together.

4. The car seat holder as claimed in claim 3 comprises:
the left clamp and the right clamp each further comprise a rod-receiving mouth;
the rod-receiving mouth of the left clamp being positioned parallel to the first length-adjustable rod;
the rod-receiving mouth of the right clamp being positioned parallel to the first length-adjustable rod; and
the rod-receiving mouth of the left clamp and the rod-receiving mouth of the right clamp being positioned collinear to each other.

5. The car seat holder as claimed in claim 1 comprises:
the first length-adjustable member and the second length-adjustable member each comprise a first tubular body and a second tubular body; and
the first tubular body and the second tubular body being telescopically engaged to each other.

6. The car seat holder as claimed in claim 5 comprises:
the first length-adjustable member and the second length-adjustable member each further comprise an annular retention cap;
the annular retention cap being terminally mounted to the second tubular body; and
the annular retention cap being compressively connected within the first tubular body.

7. The car seat holder as claimed in claim 1 comprises:
a length-adjustable strap;
the length-adjustable strap comprises a first strap end and a second strap end;
the first strap end being rotatably connected to the first length-adjustable member; and
the second strap end being rotatably connected to the second length-adjustable member.

8. The car seat holder as claimed in claim 1 comprises:
a basket;
the basket being mounted along the first support; and
the basket being positioned opposite to the canvas about the first support.

9. The car seat holder as claimed in claim 1 comprises:
the canvas comprises a third edge and a fourth edge;
the third edge and the fourth edge being positioned opposite to each other across the canvas;
the third edge and the fourth edge being positioned in between the first edge and the second edge;
the third edge being positioned adjacent to the left clamp and the left bracket; and
the fourth edge being positioned adjacent to the right clamp and the right bracket.

10. A car seat holder comprises:
a first support;
a second support;
a canvas;
a length-adjustable strap;
the first support comprises a left bracket, a right bracket, and a first length-adjustable member;
the second support comprises a left clamp, a right clamp, and a second length-adjustable member;
the canvas comprises a first edge and a second edge;
the left bracket being terminally connected to the first length-adjustable member;
the right bracket being terminally connected to the first length-adjustable member, opposite the left bracket;
the left clamp being terminally connected to the second length-adjustable member;
the right clamp being terminally connected to the second length-adjustable member, opposite the left clamp;
the first edge and the second edge being positioned opposite to each other across the canvas;
the first edge being slidably connected along the first length-adjustable member;
the second edge being slidably connected along the second length-adjustable member;
the length-adjustable strap comprises a first strap end and a second strap end;
the first strap end being rotatably connected to the first length-adjustable member; and
the second strap end being rotatably connected to the second length-adjustable member.

11. The car seat holder as claimed in claim 10 comprises:
the left bracket and the right bracket each comprise a U-shaped body and a padding;
the U-shaped body comprises an inner surface; and
the padding being connected along the inner surface.

12. The car seat holder as claimed in claim 10 comprises:
the left clamp and the right clamp each comprise an upper jaw, a lower jaw, and a releasable locking mechanism;
the upper jaw and the lower jaw being hingedly connected to each other; and
the releasable locking mechanism being operatively integrated in between the upper jaw and the lower jaw, wherein the releasable locking mechanism is used to selectively clamp the upper jaw and lower jaw together.

13. The car seat holder as claimed in claim 12 comprises:
the left clamp and the right clamp each further comprise a rod-receiving mouth;
the rod-receiving mouth of the left clamp being positioned parallel to the first length-adjustable rod; and
the rod-receiving mouth of the right clamp being positioned parallel to the first length-adjustable rod.

14. The car seat holder as claimed in claim 10 comprises:
the first length-adjustable member and the second length-adjustable member each comprise a first tubular body and a second tubular body; and
the first tubular body and the second tubular body being telescopically engaged to each other.

15. The car seat holder as claimed in claim 14 comprises:
the first length-adjustable member and the second length-adjustable member each further comprise an annular retention cap;
the annular retention cap being terminally mounted to the second tubular body; and
the annular retention cap being compressively connected within the first tubular body.

16. The car seat holder as claimed in claim 10 comprises:
a basket;
the basket being mounted along the first support; and
the basket being positioned opposite to the canvas about the first support.

17. The car seat holder as claimed in claim 10 comprises:
the canvas comprises a third edge and a fourth edge;
the third edge and the fourth edge being positioned opposite to each other across the canvas;
the third edge and the fourth edge being positioned in between the first edge and the second edge;
the third edge being the left clamp and the left bracket; and
the fourth edge being positioned adjacent to the right clamp and the right bracket.

* * * * *